United States Patent
Lee et al.

(10) Patent No.: US 9,215,614 B2
(45) Date of Patent: Dec. 15, 2015

(54) CONTROLLING FEMTOCELL OPERATION BANDWIDTH BASED ON INTERFERENCE TO MACROCELL

(75) Inventors: Ki-Ho Lee, Gyeonggi-do (KR); Yong-Gyoo Lee, Seoul (KR); Yung-Ha Ji, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 13/447,381

(22) Filed: Apr. 16, 2012

(65) Prior Publication Data

US 2012/0264445 A1 Oct. 18, 2012

(30) Foreign Application Priority Data

Apr. 14, 2011 (KR) .................. 10-2011-0034851

(51) Int. Cl.
| | | |
|---|---|---|
| H04W 72/00 | (2009.01) | |
| H04W 28/04 | (2009.01) | |
| H04W 16/32 | (2009.01) | |
| H04W 28/06 | (2009.01) | |
| H04W 28/20 | (2009.01) | |
| H04W 84/04 | (2009.01) | |

(52) U.S. Cl.
CPC ............ *H04W 28/048* (2013.01); *H04W 16/32* (2013.01); *H04W 28/06* (2013.01); *H04W 28/20* (2013.01); *H04W 84/045* (2013.01)

(58) Field of Classification Search
CPC .......... H04W 72/0453; H04W 72/082; H04W 28/20; H04W 28/16; H04B 1/10; H04B 1/0475; H04B 15/00
USPC ............... 455/450, 452.1, 452.2, 200.1, 266, 455/278.1, 63.1, 114.2, 296
See application file for complete search history.

(56) References Cited

U.S. PATENT DOCUMENTS

| | | | |
|---|---|---|---|
| 7,796,514 B2 | 9/2010 | Noriega | |
| 2006/0178153 A1 | 8/2006 | Tenny et al. | |
| 2008/0101331 A1* | 5/2008 | Lee et al. | 370/350 |
| 2009/0061806 A1* | 3/2009 | Saito et al. | 455/296 |
| 2009/0111525 A1 | 4/2009 | Hwang et al. | |
| 2009/0238143 A1 | 9/2009 | Mukherjee et al. | |
| 2009/0296864 A1* | 12/2009 | Lindoff et al. | 375/357 |
| 2010/0008324 A1 | 1/2010 | Lee et al. | |

(Continued)

FOREIGN PATENT DOCUMENTS

| | | |
|---|---|---|
| KR | 10-2005-0068400 A | 7/2005 |
| KR | 10-2005-0121136 A | 12/2005 |

(Continued)

*Primary Examiner* — Mazda Sabouri
*Assistant Examiner* — Edward Zhang
(74) *Attorney, Agent, or Firm* — IP Legal Services, LLC (57) ABSTRACT

The disclosure is related to controlling an operation bandwidth for a femtocell based on femtocell interference to a macrocell in order to minimize femtocell interference. A femtocell base station may include a measurement unit, a transmitting unit, and a control unit. The measurement unit may be configured to measure an interference amount of a macrocell adjacent to the femtocell base station. The transmitting unit may be configured to transmit the measured interference amount to a system. The control unit may be configured to i) accept an allocated operation bandwidth by the system and ii) control transmission and reception of signals with the allocated operation bandwidth. The operation bandwidth may be adjustable by the system based on the measured interference amount.

13 Claims, 4 Drawing Sheets

(56) References Cited

U.S. PATENT DOCUMENTS

| | | | |
|---|---|---|---|
| 2010/0015978 A1 | 1/2010 | Yoon et al. | |
| 2010/0075679 A1 | 3/2010 | Tenny et al. | |
| 2010/0099431 A1* | 4/2010 | Sampath et al. | 455/454 |
| 2010/0113060 A1* | 5/2010 | Bai et al. | 455/453 |
| 2010/0216486 A1 | 8/2010 | Kwon et al. | |
| 2011/0003609 A1* | 1/2011 | Sundstr m et al. | 455/509 |
| 2011/0013523 A1* | 1/2011 | Ding et al. | 370/242 |
| 2011/0013560 A1 | 1/2011 | Zhang et al. | |
| 2011/0081913 A1* | 4/2011 | Lee et al. | 455/450 |
| 2011/0092214 A1 | 4/2011 | Iwamura | |
| 2011/0280196 A1* | 11/2011 | Maggenti et al. | 370/329 |

FOREIGN PATENT DOCUMENTS

| | | |
|---|---|---|
| KR | 10-2007-0110348 A | 11/2007 |
| KR | 10-2008-0026855 A | 3/2008 |
| KR | 10-2008-0080801 A | 9/2008 |
| KR | 10-2009-0044352 A | 5/2009 |
| KR | 10-0920894 B1 | 10/2009 |
| KR | 10-2010-0003664 A | 1/2010 |
| KR | 10-2010-0004833 A | 1/2010 |
| KR | 10-2010-0021156 A | 2/2010 |
| KR | 10-2010-0029869 A | 3/2010 |
| KR | 10-2010-0060353 A | 6/2010 |
| KR | 10-2010-0092742 A | 8/2010 |
| KR | 10-2010-0096325 A | 9/2010 |
| KR | 10-2010-0123550 A | 11/2010 |
| KR | 10-2010-0126776 A | 12/2010 |
| KR | 10-2010-0126818 A | 12/2010 |
| KR | 10-2010-0133821 A | 12/2010 |
| KR | 10-2011-0099327 A | 9/2011 |

* cited by examiner

| Comparison result | Femtocell bandwidth |
|---|---|
| A ≤ Interference amount < B | 1.4 |
| B ≤ Interference amount < C | 3 |
| C ≤ Interference amount < D | 5 |
| D ≤ Interference amount < E | 10 |
| E ≤ Interference amount < F | 15 |
| F ≤ Interference amount < G | 20 |

CONTROLLING FEMTOCELL OPERATION BANDWIDTH BASED ON INTERFERENCE TO MACROCELL

CROSS REFERENCE TO PRIOR APPLICATIONS

The present application claims priority under 35 U.S.C. §119 to Korean Patent Application No. 10-2011-0034851 (filed on Apr. 14, 2011), which is hereby incorporated by reference in its entirety.

FIELD OF THE INVENTION

The present invention relates to communications and, in particular, to operating a femtocell according to femtocell interference to a macrocell.

BACKGROUND OF THE INVENTION $3^{rd}$ generation partnership project (3GPP) long term evolution (LTE) standards have defined to support scalable bandwidth. For example, base stations supporting a scalable bandwidth may dynamically operate with a bandwidth chosen in a scalable bandwidth range based on status of its surroundings. According to the 3GPP LTE standards, the scalable bandwidth may be applied to femtocells.

A femtocell may be a small service area that is managed and controlled by a femtocell base station. The femtocell base station is designed to connect user equipment located in a femtocell to a service provider's network. The femtocell may be established in a home or a small business office in a cellular system. The range of a femtocell base station may be about 10 to 30 meters. The femtocell base station may allow access to about 4 to 7 devices simultaneously.

Femtocell base stations may be frequently installed at a shadow area in a macrocell. The shadow area of the macrocell denotes an area where signals of the macrocell base station are generally weak, degraded or otherwise seriously deteriorated. For example, the shadow area of the macrocell may be an inside of a building or a home. Femtocell base stations may improve overall quality of a mobile communication service supported by the macrocell.

However, signals of one or more femtocell base stations and a macrocell base station operating in a given area may interfere with each other. Such interference may degrade the overall quality of a mobile communication service supported in the given area.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, an operation bandwidth of a femtocell may be controlled based on femtocell interference to a macrocell.

In accordance with another aspect of the present invention, an operation bandwidth for a femtocell may be determined according to an interference amount of macrocell.

In accordance with another aspect of the present invention, femtocell interference to a macrocell may be minimized by dynamically adjusting a femtocell operation bandwidth according to an interference amount of a macrocell.

In accordance with an exemplary embodiment of the present invention, a method may be provided for controlling an operation bandwidth of a second cell adjacent to a first cell. The method may include measuring an interference amount of the first cell; and determining the operation bandwidth for the second cell based on the interference amount of the first cell.

For the measuring, the interference amount of first cell may be a value measured based on interference to each first cell signal by one or more second cell signals.

The method may include scanning and receiving, by a second cell base station associated with the second cell, the first cell signals transmitted from the first cell, detecting signals interfered with by the second cell signal, and, for the measuring, measuring the interference amount based on the detected interfered signals.

The determining the operation bandwidth may include comparing the interference amount with a reference level, and selecting the operation bandwidth within a scalable bandwidth range for the second cell based on the comparison result.

The selecting the operation bandwidth includes selecting an operation bandwidth narrower than an initial operation bandwidth within the scalable bandwidth range when the interference amount is greater than the reference level, and selecting an operation bandwidth wider than the initial operation bandwidth within the scalable bandwidth range when the interference amount is smaller than the reference level.

The determining the operation bandwidth includes comparing the interference amount with multiple reference levels, and selecting an operation bandwidth, by mapping the comparison result to a mapping table.

The mapping table may include the multiple reference levels and a plurality of operation bandwidths associated with a plurality of comparison results. The mapping may include comparing the interference amount with the multiple reference levels and a plurality of operation bandwidths mapped to the plurality of comparison results, respectively.

The method may further include allocating the determined operation bandwidth to the second cell. A second cell base station associated with the second cell may employ the allocated operation bandwidth for transmission and reception of second cell signals.

The first cell may be a macrocell, the second cell may be a femtocell, and the second cell base station may be a femtocell base station.

In accordance with another embodiment of the present invention, a method may be provided for adjusting an operation bandwidth of a femtocell base station to substantially reduce femtocell interference to a macrocell. The method may include measuring an interference amount of the macrocell, transmitting the measured interference amount to a system, and accepting an allocated operation bandwidth by the system. The operation bandwidth may be adjustable by the system based on the measured interference amount of the macrocell.

The measuring the interference amount may include scanning and receiving macrocell signals transmitted from the macrocell detecting signals interfered by femtocell signals, and measuring the interference amount of the macrocell based on the detected interfered signals.

For the accepting, the method may include selecting the operation bandwidth from a scalable bandwidth range reserved for femtocells by comparing the interference amount with at least one reference level.

The selecting the operation bandwidth may include selecting, as the selected operation bandwidth, an operation bandwidth narrower than an initial operation bandwidth from the scalable bandwidth range when the interference amount is greater than the reference level, and selecting, as the selected operation bandwidth, an operation bandwidth wider than the initial operation bandwidth from the scalable bandwidth range when the interference amount is smaller than the reference level.

For the selecting, the method may include mapping the comparison result with the operation bandwidth based on a mapping table. The mapping table may include multiple reference levels and a plurality of operation bandwidths associated with a plurality of comparison results, wherein the mapping includes comparing the interference amount with the multiple reference levels and a plurality of operation bandwidths mapped to the plurality of comparison results, respectively.

In accordance with another embodiment of the present invention, a femtocell base station may include a measurement unit, a transmitting unit, and a control unit. The measurement unit may be configured to measure an interference amount of a macrocell adjacent to the femtocell base station. The transmitting unit may be configured to transmit the measured interference amount to a system. The control unit may be configured to i) accept an allocated operation bandwidth by the system and ii) control transmission and reception of signals with the allocated operation bandwidth. The operation bandwidth may be adjustable by the system based on the measured interference amount.

The measuring unit may be configured to regularly scan and receive macrocell signals transmitted from the macrocell, detect signals interfered by femtocell signals, and measure the interference amount of the macrocell based on the detected interfered signals.

The system may select the operation bandwidth from a scalable bandwidth range reserved for femtocells by comparing the interference amount with at least one reference level.

The system may include a receiving unit and a comparison unit. The receiving unit may be configured to receive the interference amount of the macrocell. The comparison unit may be configured to i) compare the interference amount with at least one reference level, and ii) select the operation bandwidth within a scalable bandwidth range based on the comparison result.

The comparison unit may be configured to select an operation bandwidth narrower than an initial operation bandwidth from the scalable bandwidth range when the interference amount is greater than the at least one reference level, and select an operation bandwidth wider than the initial operation bandwidth from the scalable bandwidth range when the interference amount is smaller than the least one reference level.

The comparison unit may be configured to compare the interference amount with multiple reference levels, and select an operation bandwidth mapped to the comparison result from a mapping table. The mapping table may include a plurality of comparison results that are obtained by comparing the interference amount with the multiple reference levels and a plurality of operation bandwidths mapped to the plurality of comparison results, respectively.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with an embodiment of the present invention, an operation bandwidth of a femtocell may be controlled according to femtocell interference to a macrocell in order to minimize femtocell interference. Particularly, an operation bandwidth for a femtocell may be dynamically selected within a scalable bandwidth range reserved for a femtocell based on an interference amount of a macrocell. The selected operation bandwidth may be allocated to a corresponding femtocell base station and the corresponding femtocell base station may provide a femtocell service using the allocated operation bandwidth in accordance with an embodiment of the present invention. Hereinafter, femtocell base stations and an operation and maintenance for controlling a femtocell bandwidth according to femtocell interference to a macrocell will be described with reference to FIG. 1.

Figure 1:
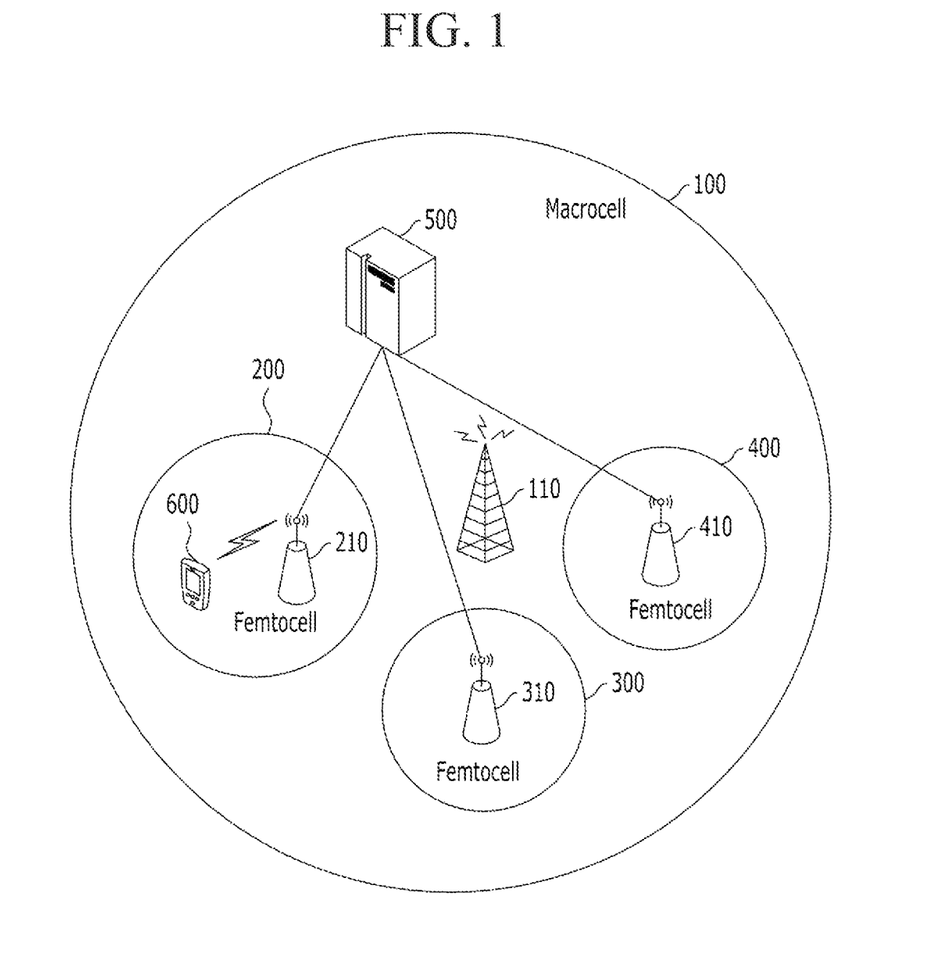
FIG. 1 shows an operation and maintenance system and femtocell base stations controlling a femtocell bandwidth based on femtocell interference to a macrocell in accordance with an embodiment of the present invention.

FIG. 1 shows an operation and maintenance system and femtocell base stations for controlling a femtocell operation bandwidth based femtocell interference to a macrocell in accordance with an embodiment of the present invention.

Referring to FIG. 1, macrocell 100 may be overlapped with a plurality of femtocells 200, 300, and 400. Macrocell base station 110 may control and manage entities located in macrocell 100. Femtocell base stations 210, 310, and 410 may respectively control and manage entities located in femtocells 200, 300, and 400. Operation and maintenance system 500 may be coupled with at least one of femtocell base stations 210, 310, and 410.

Femtocell base stations 210, 310, and 410 may provide a femtocell service to user equipment 600 located in femtocell 200, respectively. For example, femtocell base station 210 may connect user equipment 600 over wireless air interface to a service provider's network. Femtocell base stations 210, 310, and 410 may be assigned with an operation bandwidth within a scalable femtocell bandwidth range, for example, a range of about 1.4 MHz to 20 MHz. Femtocell base stations 210, 310, and 410 may provide a corresponding femtocell service using the assigned femtocell operation bandwidth.

In accordance with an embodiment of the present invention, femtocell base stations 210, 310, and 410 may regularly scan and receive macrocell signals from macrocell base station 110 and detect a signal subject to interference (referred to herein as an "interfered signal") from the received signals. The interfered signal may be a macrocell signal interfered by a femtocell signal of femtocell base station 210. Femtocell base stations 210, 310, and 410 may i) measure the amount or level of interference of the interfered macrocell signal and ii)

transmit the measured interference amount of the interfered macrocell signal to operation and maintenance system 500.

Femtocell base stations 210, 310, and 410 may be assigned with a femtocell operation bandwidth by operation and maintenance system 500, and femtocell base stations 210, 310, and 410 may control transmission and reception of various related signals using this assigned femtocell operation bandwidth. As employed herein, the term "femtocell bandwidth" may also be employed to refer to the femtocell operation bandwidth for a given femtocell. Femtocell base stations 210, 310, and 410 may provide a service to user equipment 600 using a femtocell bandwidth assigned based on femtocell interference to macrocell 100.

Operation and maintenance system 500 may select a femtocell bandwidth within a scalable femtocell bandwidth range reserved for femtocell base stations 210, 310, and 410 in accordance with an embodiment of the present invention. For example, operation and maintenance system 500 may regularly receive measured values of the amount of interference experienced by macrocell 100 from at least one of femtocell base stations 210, 310, and 410. Operation and maintenance system 500 may compare the received interference amount value with at least one reference level and select a femtocell bandwidth within a scalable femtocell bandwidth range according to the result of the comparison.

The interference amount may be compared with one reference level or multiple reference levels. When the interference amount is greater than the reference level, one femtocell bandwidth narrower than an initial femtocell bandwidth may be selected within a scalable femtocell bandwidth range. When the interference amount is smaller than the reference level, one femtocell bandwidth wider than an initial femtocell bandwidth may be selected within a scalable femtocell bandwidth range. Accordingly, an overall service quality may be controlled while minimizing the femtocell interference to macrocell 100.

The interference amount may be compared with multiple reference levels. In this case, operation and maintenance system 500 may use a mapping table in conjunction with the comparison with multiple reference levels. The mapping table may include a plurality of comparison results that may be obtained by comparing the interference amount with multiple reference levels. The mapping table may further include a plurality of femtocell bandwidths mapped to the plurality of comparison results, respectively. The plurality of femtocell bandwidths may be included in a scalable bandwidth range reserved for a femtocell. For example, operation and maintenance system 500 may compare the received interference amount with multiple reference levels A to G. The multiple reference levels A to G may be integer numbers each denoting a certain interference amount. When the received interference amount is equal to and greater than a reference level A and smaller than a reference level B, operation and maintenance system 500 may select a femtocell bandwidth of about 1.4 MHz, which is mapped to the corresponding comparison result in the mapping table. Accordingly, each femtocell bandwidth may be dynamically selected according to an interference status that varies, sometimes rapidly or abruptly, in a related communication environment. Such a mapping table as described herein may be stored in a database of, or coupled to, operation and maintenance system 500. After selecting the appropriate femtocell bandwidth for each femtocell, operation and maintenance system 500 may then allocate the corresponding selected femtocell bandwidth to one or more of femtocell base stations 210, 310, and 410.

User equipment 600 may access to femtocell base station 210 assigned with one femtocell bandwidth within a scalable femtocell bandwidth range and receive a femtocell service from femtocell base station 210. Here, user equipment 600 may support scalable bandwidth. For example, user equipment 600 may access base stations using different bandwidths and receive services therefrom.

Hereinafter, femtocell base stations 210, 310, and 410 and operation and maintenance system 500 will be described with reference to FIG. 2 and FIG. 3, respectively. For convenience and ease of understanding, femtocell base station 210 will be described representatively. Femtocell base stations 310 and 410 may have a structure similar to that of femtocell base station 210 and operate in an analogous manner.

Figure 2:
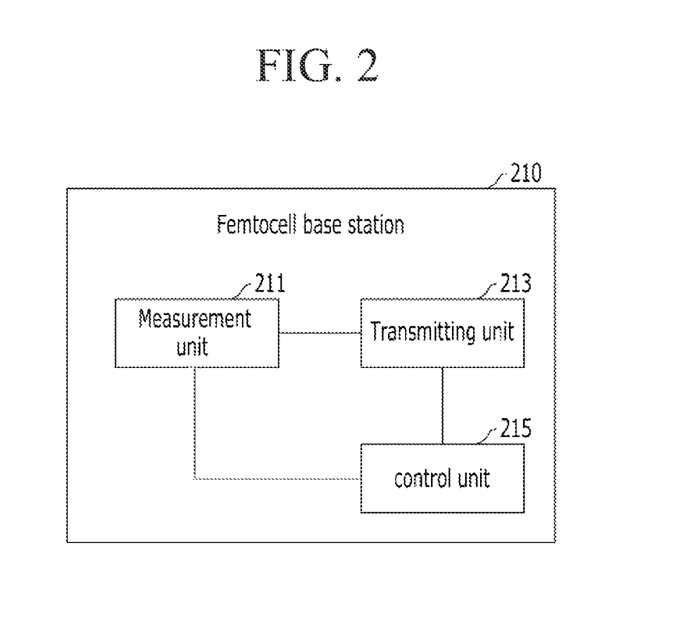
FIG. 2 shows a femtocell base station in accordance with an embodiment of the present invention.

FIG. 2 shows a femtocell base station in accordance with an embodiment of the present invention.

Referring to FIG. 2, femtocell base station 210 may include measurement unit 211, transmitting unit 213, and control unit 215.

Measurement unit 211 may regularly scan and receive macrocell signals from macrocell base station 110 and detect an interfered signal from the received signals. The interfered signal may be a macrocell signal subject to interference by a femtocell signal of femtocell base station 210. Measurement unit 211 may measure an interference amount of the detected interfered macrocell signal.

Transmitting unit 213 may transmit the measured interference amount of the interfered macrocell signal to operation and maintenance system 500.

Control unit 215 may receive a femtocell bandwidth (not shown in FIG. 2) from operation and maintenance system 500. The femtocell bandwidth may be an operation bandwidth selected within a scalable bandwidth range for femtocells based on the interference amount. Control unit 215 may control transmitting and receiving related signals using the femtocell bandwidth assigned by operation and maintenance system 500.

As described above, femtocell base stations 210, 310, and 410 may provide service to user equipment 600 using a femtocell bandwidth that is assigned based on femtocell interference to macrocell 100. For example, when macrocell 100 is subject to serious interference by signals of femtocells 200, 300, and 400, a comparatively narrow femtocell bandwidth may be assigned to femtocells 200, 300, and 400. Accordingly the femtocell interference to macrocell 100 may be reduced or otherwise minimized according to some objective criterion. Since macrocell 100 provides a service to more users than femtocells 200, 300, and 400, femtocell bandwidth may be controlled to maintain or to improve overall service quality of a related communication network served by macrocell 100.

As described above, operation and maintenance system 500 may receive the interference amount of macrocell 100, select one femtocell operation bandwidth from the scalable femtocell bandwidth range, and assign the selected femtocell operation bandwidth to femtocells 200, 300, and 400. Hereinafter, operation and maintenance system 500 will be described with reference to FIG. 3.

Figure 3:
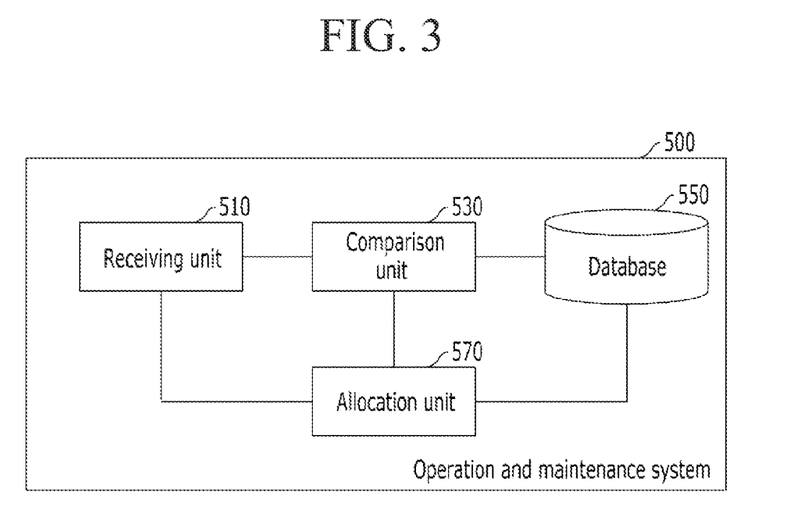
FIG. 3 illustrates an operation and maintenance system in accordance with an embodiment of the present invention.

FIG. 3 illustrates an operation and maintenance system in accordance with an embodiment of the present invention.

Referring to FIG. 3, operation and maintenance system 500 may include receiving unit 510, comparison unit 530, database 550, and allocation unit 570.

Receiving unit 510 may regularly receive a corresponding value of interference amount of macrocell 100 from, and possible associated with, at least one of femtocell base stations 210, 310, and 410. The present invention, however, is not limited thereto. The interference amount of macrocell 100 may be measured by another device or devices distributed throughout the service area, and provided operation and maintenance system 500. The interference amount of macrocell 100 may be measured by operation and maintenance system 500. The interference amount may be measured from a specifically designed macrocell signal (providing advantages for a measurement device that derives a value from the ultimately interfered signal) that is interfered by a femtocell signal of at least one of femtocell base stations 210, 310, and 410.

Comparison unit 530 may compare the received interference amount with at least one reference level and select a femtocell bandwidth within a scalable femtocell bandwidth range according to the comparison result. For example, comparison unit 530 may compare the interference amount with one reference level or multiple reference levels. In order to compare and select, comparison unit 530 may refer to database 550 for the reference levels and the scalable femtocell bandwidth range.

When the interference amount is compared with one reference level, comparison unit 530 may compare the received interference amount with one reference level stored in database 550. When the interference amount is greater than the reference level, comparison unit 530 may select one femtocell bandwidth narrower than an initial femtocell bandwidth, within a scalable femtocell bandwidth range. For example, when the initial femtocell bandwidth is 5 MHz, a femtocell bandwidth of 3 MHz may be selected and assigned to femtocell base stations 210, 310, and 410. Femtocell base stations 210, 310, and 410 may provide a femtocell service using the femtocell bandwidth of about 3 MHz. When the interference amount is smaller than the reference level, comparison unit 530 may select one femtocell bandwidth wider than an initial femtocell bandwidth, within a scalable femtocell bandwidth range. For example, when the initial femtocell bandwidth is about 5 MHz, a femtocell bandwidth of about 10 MHz may be selected and assigned to femtocell base stations 210, 310, and 410. Femtocell base stations 210, 310, and 410 may provide a femtocell service using the femtocell bandwidth of about 10 MHz. Accordingly, an overall service quality may be controlled while reducing or otherwise minimizing the femtocell contribution to interference to macrocell 100.

When the interference amount is compared with multiple reference levels, a mapping table may be used. The mapping table may include a plurality of comparison results that may be obtained by comparing the interference amount with multiple reference levels. The mapping table may further include a plurality of femtocell bandwidths mapped to the plurality of comparison results, respectively. Such mapping table may be stored in database 550. An exemplary mapping table is described subsequently with reference to FIG. 4. For example, comparison unit 530 may compare the received interference amount with multiple reference levels A to G. The multiple reference levels A to G may be integer numbers each denoting a certain interference amount. When the received interference amount is equal to and greater than a reference level A and smaller than a reference level B, comparison unit 530 may select a femtocell bandwidth of about 1.4 MHz which is mapped to the corresponding comparison result in the mapping table. Accordingly, a femtocell bandwidth may be dynamically selected according to interference status that varies abruptly in a related communication environment.

Database 550 may store information on i) reference levels for comparison and ii) femtocell bandwidths reserved for supporting scalable bandwidth. For example, database 550 may store the mapping table including a plurality of femtocell bandwidths mapped to a plurality of comparison results, respectively. Database 550 may be referred to for selecting a femtocell bandwidth within a scalable femtocell bandwidth range based on the received interference amount.

Allocation unit 570 may allocate the selected femtocell bandwidth to femtocell base stations 210, 310, and 410. Such allocation might be through a negotiation or other exchange of communication and/or control channel messaging between operation and maintenance system 500 and the corresponding femtocell base station.

Figure 4:
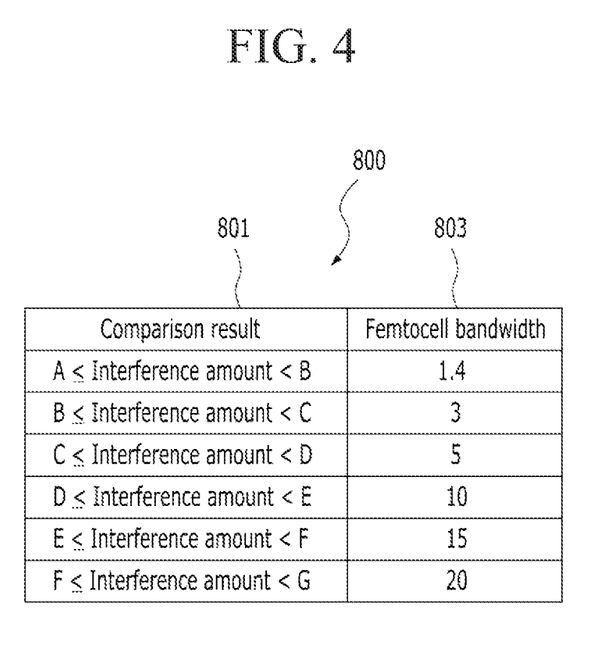
FIG. 4 shows a mapping table stored in a database in accordance with an embodiment of the present invention.

FIG. 4 shows a mapping table stored in a database in accordance with an embodiment of the present invention.

Referring to FIG. 4, database 550 may include mapping table 800 as described above. Mapping table 800 may include comparison results 801 that may be obtained by comparing the interference amount with reference levels A to G. Mapping table 800 may also include femtocell bandwidths 803 mapped to the comparison results. The reference levels A to G may be integer numbers each denoting a certain interference amount. For example, when the interference amount is equal to and greater than the reference level A and smaller than the reference level B, a femtocell bandwidth of about 1.4 MHz may be mapped thereto. When the interference amount is equal to and greater than the reference level B and smaller than the reference level C, a femtocell bandwidth of about 3 MHz may be mapped thereto. When the interference amount is equal to and greater than the reference level C and smaller than the reference level D, a femtocell bandwidth of about 5 MHz may be mapped thereto. When the interference amount is equal to and greater than the reference level D and smaller than the reference level E, a femtocell bandwidth of about 10 MHz may be mapped thereto. When the interference amount is equal to and greater than the reference level E and smatter than the reference level F, a femtocell bandwidth of about 15 MHz may be mapped thereto. When the interference amount is equal to and greater than the reference level F and smaller than the reference level G, a femtocell bandwidth of about 20 MHz may be mapped thereto. The exemplary femtocell bandwidths 1.4 MHz, 3 MHz, 5 MHz, 10 MHz, 15 MHz, and 20 MHz may be defined as scalable bandwidths reserved for femtocells 200, 300, and 400. Operation and maintenance system 500 may select one of femtocell bandwidths according to the comparison result using mapping table 800 stored in database 550.

As described above, operation and maintenance system 500 may control a femtocell bandwidth according to femtocell interference to a macrocell. Accordingly, femtocell interference to a macrocell may be minimized while providing femtocell services. Hereinafter, a method for controlling a femtocell bandwidth based on femtocell interference to a macrocell in accordance with an embodiment of the present invention will be described with reference to FIG. 5. Throughout FIG. 1 to FIG. 5, the like reference numerals denote the like elements.

Figure 5:
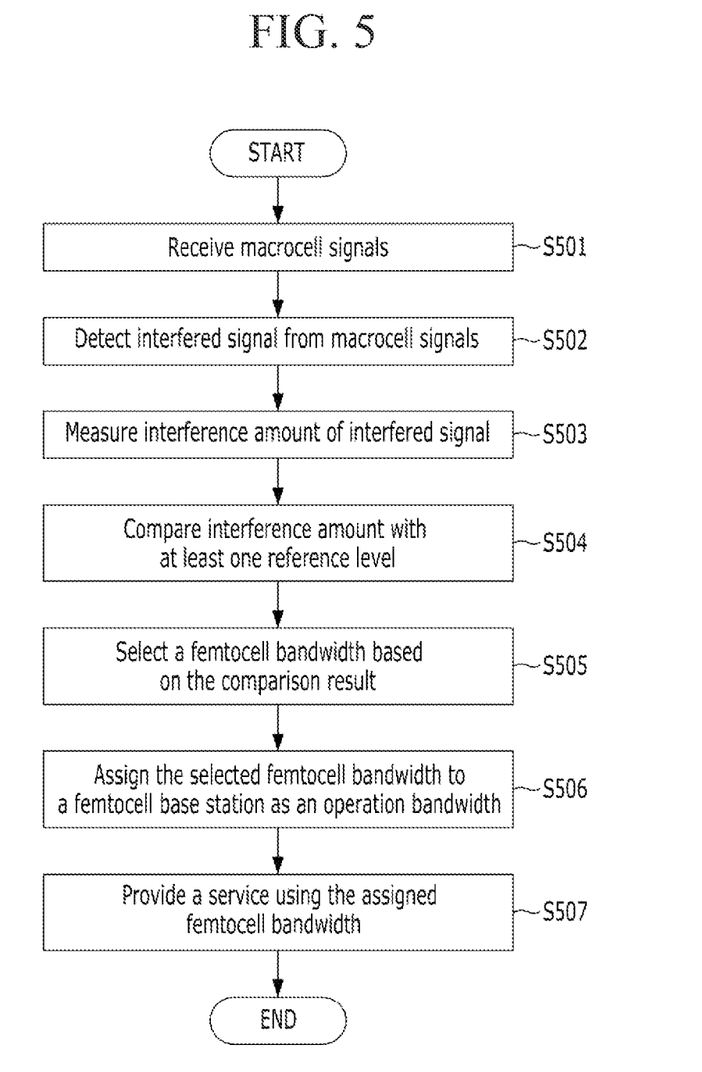
FIG. 5 shows a method for controlling a femtocell bandwidth based on femtocell interference to a macrocell in accordance with an embodiment of the present invention.

FIG. 5 shows a method for controlling a femtocell bandwidth based on femtocell well interference to a macrocell in accordance with an embodiment of the present invention.

Referring to FIG. 5, macrocell signals may be scanned and received at step S501. The macrocell signals may be signals transmitted from macrocell base station 110. For example, femtocell base station 210 may scan and receive macrocell signals transmitted from macrocell base station 110. Femtocell base station 210 may be in a listening mode when macrocell signals are scanned and received. The macrocell signals may be regularly scanned and received in order to dynamically control a femtocell bandwidth within a scalable femtocell bandwidth range according to femtocell and macrocell status which changes dynamically, rapidly, and/or abruptly.

An interfered signal may be detected from the received macrocell signals at step S502. The interfered signal may be a macrocell signal interfered by femtocell signals transmitted from femtocell base station 210. For example, femtocell base station 210 may detect the interfered signal from the macrocell signals.

Interference amount may be measured from the detected interfered signal at step S503. For example, femtocell base station 210 may measure the interference amount of the interfered signal, but the present invention is not limited thereto. Operation and maintenance system 500 may measure the interference amount of the interfered signal of macrocell 100.

The interference amount may be compared with at least one given reference level at step S504. For example, the interference amount may be compared with one reference level or multiple reference levels. When the interference amount is compared with multiple reference levels, a mapping table may be used. The mapping table may include a plurality of comparison results that may be obtained by comparing the interference amount with multiple reference levels. The mapping table may further include a plurality of femtocell bandwidths reserved for femtocells to support scalable bandwidth. The plurality of comparison results may be mapped to the plurality of femtocell bandwidths, respectively. Since the mapping table and the comparison method were already described above, the detailed description thereof will be omitted herein.

A femtocell bandwidth may be selected based on the comparison result at step S505. For example, when one reference level is used for comparison, a femtocell bandwidth wider than an initial operation bandwidth may be selected from available femtocell bandwidths stored in database 350. When multiple reference levels are used for comparison, a femtocell bandwidth mapped to a respective comparison result may be selected.

The selected femtocell bandwidth may be assigned to a femtocell base station as an operation bandwidth at step S506, and a femtocell service may be provided using the assigned femtocell bandwidth at step S507.

As described above, a femtocell bandwidth, an operation bandwidth of a femtocell base station, may be controlled according to femtocell interference to a macrocell. For example, when macrocell signals are seriously interfered by femtocell signals, the femtocell bandwidth may be reduced. Accordingly, femtocell interference to a macrocell may be minimized.

As described above, the interference amount to a macrocell may be regularly monitored and measured. Accordingly, femtocell bandwidth may be dynamically controlled according to communication network status.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling an operation bandwidth of a second cell adjacent to a first cell, the method comprising:
    measuring an interference amount of the first cell;
    comparing the measured interference amount of the first cell with multiple reference interference levels; and
    selecting, based on the comparison result, a bandwidth from a scalable bandwidth range assigned to the second cell, as the operation bandwidth of the second cell,
    wherein the selecting includes:
        selecting a bandwidth of about 1.4 MHz as the operation bandwidth of the second cell when the measured interference amount is equal to and greater than a reference level A and smaller than a reference B;
        selecting a bandwidth of about 3 MHz as the operation bandwidth of the second cell when the measured interference amount is equal to and greater than the reference level B and smaller than a reference level C;
        selecting a bandwidth of about 5 MHz as the operation bandwidth of the second cell when the measured interference amount is equal to and greater than the reference level C and smaller than a reference level D;
        selecting a bandwidth of about 10 MHz as the operation bandwidth of the second cell when the measured interference amount is equal to and greater than the reference level D and smaller than a reference level E;
        selecting a bandwidth of about 15 MHz as the operation bandwidth of the second cell when the measured interference amount is equal to and greater than the reference level E and smaller than a reference level F; and
        selecting a bandwidth of about 20 MHz as the operation bandwidth of the second cell when the interference amount is equal to and greater than the reference level F and smaller than a reference level G, and
    wherein each one of the reference levels A, B, C, D, E, F, and G is a predetermined integer number denoting a certain interference amount.

2. The method of claim 1, wherein:
    for the measuring, the interference amount of the first cell is a value measured based on interference to each first cell signal by one or more second cell signals.

3. The method of claim 2, comprising scanning and receiving, by a second cell base station associated with the second cell, the first cell signals transmitted from the first cell, detecting signals interfered with by the second cell signal, and, for the measuring, measuring the interference amount based on the detected interfered signals.

4. The method of claim 1, further comprising allocating the selected bandwidth to the second cell as the operating bandwidth,
    wherein a second cell base station associated with the second cell employs the allocated operation bandwidth for transmission and reception of second cell signals.

5. The method of claim 1, wherein the first cell is a macrocell, the second cell is a femtocell, and the second cell base station is a femtocell base station.

6. A method for adjusting an operation bandwidth of a femtocell base station to substantially reduce femtocell interference to a macrocell, the method comprising:
    measuring an interference amount of the macrocell;
    transmitting the measured interference amount to a system; and
    accepting an allocated operation bandwidth by the system,
    wherein the operation bandwidth is adjustable by the system based on the measured interference amount of the macrocell, and
    wherein the system is configured to allocate the operation bandwidth to the femtocell base station by comparing the measured interference amount of the first signal from the macrocell with multiple reference interference levels and selecting, as the operation bandwidth, a bandwidth from a scalable bandwidth range reserved for femtocells based on the comparison result,
    wherein the system is configured to select, as the operation bandwidth of the femtocell base station, a bandwidth mapped the comparison result in a mapping table, and
    wherein the mapping table includes:
        a bandwidth of about 1.4 MHz mapped to a comparing result that the measured interference amount is equal to and greater than a reference level A and smaller than a reference level B;
        a bandwidth of about 3 MHz mapped to a comparison result that the measured interference amount is equal to and greater than the reference level B and smaller than a reference level C;
        a bandwidth of about 5 MHz mapped to a comparison result that the measured interference amount is equal to and greater than the reference level C and smaller than a reference level D;
        a bandwidth of about 10 MHz mapped to a comparison result that the measured interference amount is equal to and greater than the reference level D and smaller than a reference level E;
        a bandwidth of about 15 MHz mapped to a comparison result that the measured interference amount is equal to and greater than the reference level E and smaller than a reference level F;
        a bandwidth of about 20 MHz mapped to a comparison result that the interference amount is equal to and greater than the reference level F and smaller than a reference level G; and
    each one of the reference levels A, B, C, D, E, F, and G is a predetermined integer number denoting a certain interference amount.

7. The method of claim 6, wherein the measuring the interference amount includes:
    scanning and receiving macrocell signals transmitted from the macrocell;
    detecting signals interfered by femtocell signals; and
    measuring the interference amount of the macrocell based on the detected interfered signals.

8. The method of claim 6, wherein the system is configured to:
    select, as the operation bandwidth, a bandwidth narrower than an initial operation bandwidth from the scalable bandwidth range when the interference amount is greater than a predetermined one of the multiple reference levels; and select, as the operation bandwidth, a bandwidth wider than the initial operation bandwidth from the scalable bandwidth range when the interference amount is smaller than the predetermined one of the multiple reference levels.

9. A femtocell base station comprising:

a measurement unit configured to measure an interference amount of a macrocell adjacent to the femtocell base station;

a transmitting unit configured to transmit the measured interference amount to a system; and a control unit configured to i) accept an allocated operation bandwidth by the system and ii) control transmission and reception of signals with the allocated operation bandwidth, wherein the operation bandwidth is adjustable by the system based on the measured interference amount, wherein the system is configured to allocate the operation bandwidth to the femtocell base station by comparing the measured interference amount with multiple reference interference levels and selecting, as the operation bandwidth, a bandwidth from a scalable bandwidth range reserved for femtocells based on the comparison result, wherein the system is configured to select, as the operation bandwidth of the femtocell base station, a bandwidth mapped to the comparison result in a mapping table, and wherein the mapping table includes:

a bandwidth of about 1.4 MHz mapped to a comparing result that the measured interference amount is equal to and greater than a reference level A and smaller than a reference level B;

a bandwidth of about 3 MHz mapped to a comparison result that the measured interference amount is equal to and greater than the reference level B and smaller than a reference level C;

a bandwidth of about 5 MHz mapped to a comparison result that the measured interference amount is equal to and greater than the reference level C and smaller than a reference level D;

a bandwidth of about 10 MHz mapped to a comparison result that the measured interference amount is equal to and greater than the reference level D and smaller than a reference level E;

a bandwidth of about 15 MHz mapped to a comparison result that the measured interference amount is equal to and greater than the reference level E and smaller than a reference level F;

a bandwidth of about 20 MHz mapped to a comparison result that the interference amount is equal to and greater than the reference level F and smaller than a reference level G, and wherein each one of the reference levels A, B, C, D, E, F, and G is a predetermined integer number denoting a certain interference amount.

10. The femtocell base station of claim 9, wherein the measuring unit is configured to:

regularly scan and receive macrocell signals transmitted from the macrocell;

detect signals interfered by femtocell signals; and measure the interference amount of the macrocell based on the detected interfered signals.

11. The femtocell base station of claim 9, wherein the system includes:

a receiving unit configured to receive the interference amount of the macrocell; and a comparison unit configured to i) compare the interference amount with a predetermined one of the multiple reference levels, and ii) select the operation bandwidth within a scalable bandwidth range based on the comparison result.

12. The femtocell base station of claim 9, wherein the system is configured to:

select an operation bandwidth narrower than an initial operation bandwidth from the scalable bandwidth range when the interference amount is greater than the predetermined one of the multiple reference levels; and select an operation bandwidth wider than the initial operation bandwidth from the scalable bandwidth range when the interference amount is smaller than the predetermined one of the multiple reference levels.

13. The method of claim 1, wherein:

the selecting includes:

selecting a bandwidth narrower than an initial operation bandwidth from the scalable bandwidth range when the interference amount is greater than the at least one of the multiple reference levels; and selecting a bandwidth wider than the initial operation bandwidth from the scalable bandwidth range when the interference amount is smaller than the at least one of the multiple reference levels; and the scalable bandwidth range includes 1.4 MHz, 3 MHz, 5 MHz, 10 MHz, 15 MHz, and 20 MHz.

* * * * *